United States Patent [19]

Sargent

[11] Patent Number: 4,892,349

[45] Date of Patent: Jan. 9, 1990

[54] TOILET SYSTEM WITH REMOVABLE HOLDING TANK FOR RECREATIONAL VEHICLES

[75] Inventor: Charles L. Sargent, Ann Arbor, Mich.

[73] Assignee: Thetford Corporation, Ann Arbor, Mich.

[21] Appl. No.: 193,905

[22] Filed: May 13, 1988

[51] Int. Cl.⁴ ............................................. B60R 15/04
[52] U.S. Cl. ...................................... 296/156; 296/168; 296/24.1; 296/37.1; 4/321; 4/378; 4/353
[58] Field of Search ............... 296/24.1, 37.1, 37.6, 296/156, 164, 171, 168; 4/300, 321, 378, 459, 460, 322, 323, 353

[56] References Cited

U.S. PATENT DOCUMENTS

| | | | |
|---|---|---|---|
| 1,432,740 | 10/1922 | Le Blanc | 4/322 |
| 2,743,955 | 5/1956 | Willson | 296/156 |
| 3,801,991 | 4/1974 | Fulton et al. | 4/323 |
| 4,504,983 | 3/1985 | Goodygr | 4/327 |
| 4,550,746 | 11/1985 | Hanemaayer | 296/174 X |
| 4,641,383 | 2/1987 | Sargent et al. | 4/323 |
| 4,728,144 | 3/1988 | Crean | 296/168 |
| 4,746,164 | 5/1988 | Crean | 296/156 |
| 4,776,631 | 10/1988 | Sargent et al. | 296/156 |

FOREIGN PATENT DOCUMENTS

| | | | |
|---|---|---|---|
| 83645 | 4/1983 | Italy | 296/156 |
| 0000826 | 10/1979 | World Int. Prop. O. | 4/321 |

Primary Examiner—Dennis H. Pedder
Attorney, Agent, or Firm—Harness, Dickey & Pierce

[57] ABSTRACT

The body of a recreational vehicle (RV) is disclosed with a stowage compartment within the body interior but separated from the interior occupant space. The stowage compartment contains a tank which serves as a waste holding tank for a water use sanitary toilet within the RV. The stowage compartment is partially disposed beneath the toilet and has an opening provided through the sidewall from the stowage space to the exterior. The opening is displaced longitudinally relative to the toilet such that when moving the waste holding tank into and out of the stowage compartment, the tank travels in a generally horizontal arcuate path. The holding tank is curved as seen in a plan view to accommodate the arcuate path. A track guide in the stowage compartment guides the path of the tank.

13 Claims, 7 Drawing Sheets

TOILET SYSTEM WITH REMOVABLE HOLDING TANK FOR RECREATIONAL VEHICLES

BACKGROUND AND SUMMARY OF THE INVENTION

This invention relates to recreational vehicles such as motor homes, travel trailers and other camping vehicles, and is particularly concerned with an improved toilet system with a removable holding tank.

The typical recreational vehicle (RV) comprises a wheel chassis on which a body is mounted. The body contains an interior space for use by occupants. RV's have come to enjoy increasingly popularity over the years because of the many conveniences which they provide. Today many RV's are self contained which means that they not only have there own living accommodations, but all related conveniences as well. One of the conveniences is a complete self contained water use system including a water use sanitary toilet. Fresh water for the system is contained in one or more fresh water stowage tanks and waste liquid is stored in one or more holding tanks.

Until recently it has been a practice in self contained RV's to locate the fresh water stowage tanks inside the vehicle body within the interior occupant space. Such tanks usually have generally rectangular shapes and are mounted on the body floor, for example, beneath a bench or a cabinet.

Waste water tanks were exterior of the RV body, usually being suspended from the chassis below the body floor. Because of this, they often reduce the RV's road clearance in the area of the chassis where they are located. They must be sufficiently strong to withstand damage from external force such as rocks and stones.

The waste tanks have inlets which are in communication with outlets of the respective sanitary fixture which each waste tank serves and an outlet controlled by a gate valve. These gate valves usually connect to a common outlet to which a hose is attached for dumping. When the valves are open, the tanks contents drain through the hose. Because dumping of waste to open ground is usually prohibited, the tanks are dumped either into an intermediate container which is then carried to the disposal site or else by moving the RV to the disposal site. The valves and related conduits are also exterior of the RV and hence subject to potential damage from external forces.

In general, neither fresh water tanks nor waste holding tanks are intended for removal. A recent advance in RV design is the provision of fresh water and waste holding tanks which are removable from the recreational vehicle. In such a design, a wall structure is disposed in cooperative association with the RV body floor and an adjacent exterior sidewall of the RV body to define a stowage compartment or space, which is interior of the RV body but separated from the interior occupant space of the RV body. An opening is provided through the RV's sidewall, between the exterior of the RV and the stowage compartment. This opening is typically rectangular in shape and is opened and closed by a door. The tank has a size and shape allowing it to pass bodily through this opening when the door is open. A disconnectable fluid connection is provided between the tank and the sanitary fixture which it serves.

One advantage of this design is that it provides for mounting of waste tanks in a location where they are not exposed to external forces, yet the stowage compartment is separated from the interior occupant space. The tank can be conveniently removed via the exterior of the RV and there is no need to transport the tank through the interior occupant space for either installation or removal. This is especially desirable in the case of a waste holding tank. An additional advantage is that the RV no longer has to be moved from a campsite to a waste disposal facility for disposing of the waste. The waste holding tank can be removed from the RV and carried to the disposal facility without necessitating movement of the RV.

This design of removable waste holding tanks can only be used where there is direct access from the exterior of the RV to the water use sanitary fixture. This is not always convenient with respect to the preferred location for a toilet within a recreational vehicle. In recreational vehicle design, occupant space is a major design consideration. One intrusion into the interior space of an RV body is the wheel well which houses the road wheels of the RV chassis. To avoid having the wheel well intrude into the occupant living space such as the dining or sleeping area of the recreational vehicle, it is the preferred design of many RV manufacturers to place the toilet adjacent the wheel well. This prohibits the use of removable holding tanks positioned directly below the toilet and removable sideways through the exterior wall of the recreational vehicle since the wheel well now interferes with the removal of the waste holding tank.

Accordingly, it is one object of the present invention to provide a removable waste holding tank for a water use sanitary toilet in a recreational vehicle which is adjacent a wheel well of the recreational vehicle. This is accomplished by providing a stowage compartment which is partially below the toilet and behind the toilet and curved toward an exterior wall of the RV. The waste holding tank is also curved to accommodate the curved stowage compartment such that when installing or removing the holding tank, the tank travels in an arcuate path. The stowage compartment is interior of the RV body but is separated from the interior occupant space of the RV body. The exterior opening to the stowage space is located either rearward or forward of the wheel well structure. A disconnectable fluid connection is provided between the tank and the toilet which it serves. This design, along with previous holding tank designs in which the tank is installed and removed directly outward of the toilet, provides the recreational vehicle designer with complete flexibility in locating the toilet.

Further objects, features and advantages of the invention will become apparent from a consideration of the following description and the appended claims when taken in connection with the accompanying drawing.

BRIEF DESCRIPTION OF THE DRAWING

FIG. 4A is a sectional view of the tank as seen from substantially the line 4a—4a of FIG. 4 illustrating a handle in the tank sidewall.

DETAILED DESCRIPTION OF THE DRAWINGS

Figure 1:
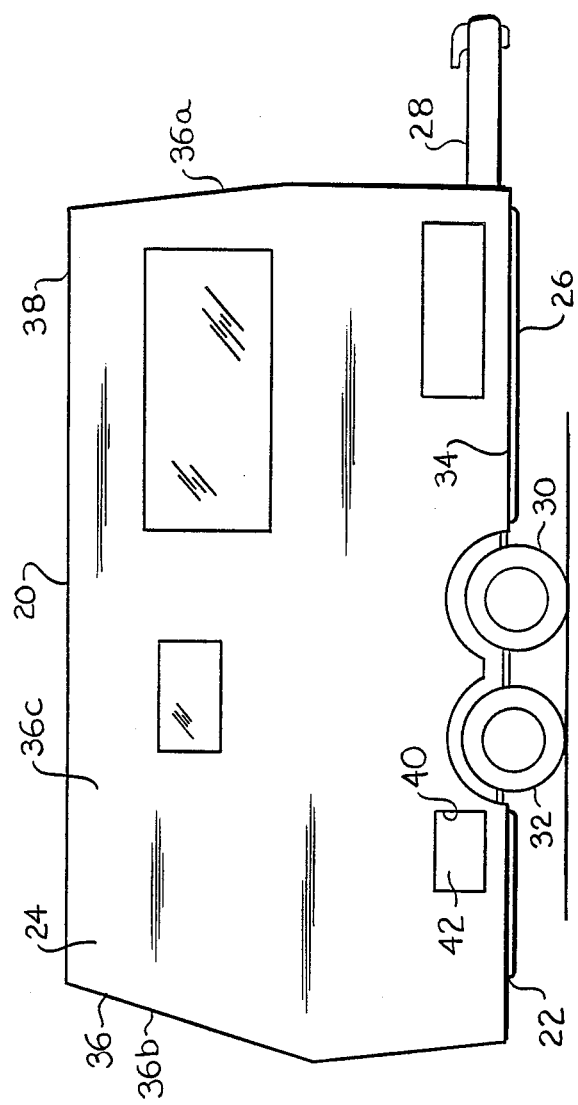
FIG. 1 is a side elevational view of a recreational vehicle (RV) having a self contained sanitary system embodying principals of the invention.

FIG. 1 illustrates a representative recreational vehicle (RV) 20 which embodies principles of this invention. RV 20 is illustrated as a travel trailer which is adapted to be pulled behind a towing vehicle (not shown). Principals of the invention are applicable to other types of RV's, including without limitation motor homes.

RV 20 comprises a wheel chassis 22 on which is supported the RV body 24. Chassis 22 comprises a perimeter frame 26 having a tongue 28 at the forward end by which the trailer connects to the towing vehicle. The chassis further comprises tandem axles which are supported from the frame 26 having tires 30 and 32.

Body 24, in general, comprises a floor 34, a vertical side 36, and a roof 38 forming an enclosure. The body is shown to be generally rectangular in shape although it is to be appreciated that any given body may have departures from such a shape. Side 36 comprises four side walls, namely a front wall 36a, a rear 36b, and two lateral side walls 36c. It is one of these lateral side walls 36c which is viewed directly in FIG. 1, and it is arranged at a right angle to floor 34. Side wall 36c is provided with a rectangular opening 40, which is shown in FIG. 1 to be closed by a door 42.

Figure 2:
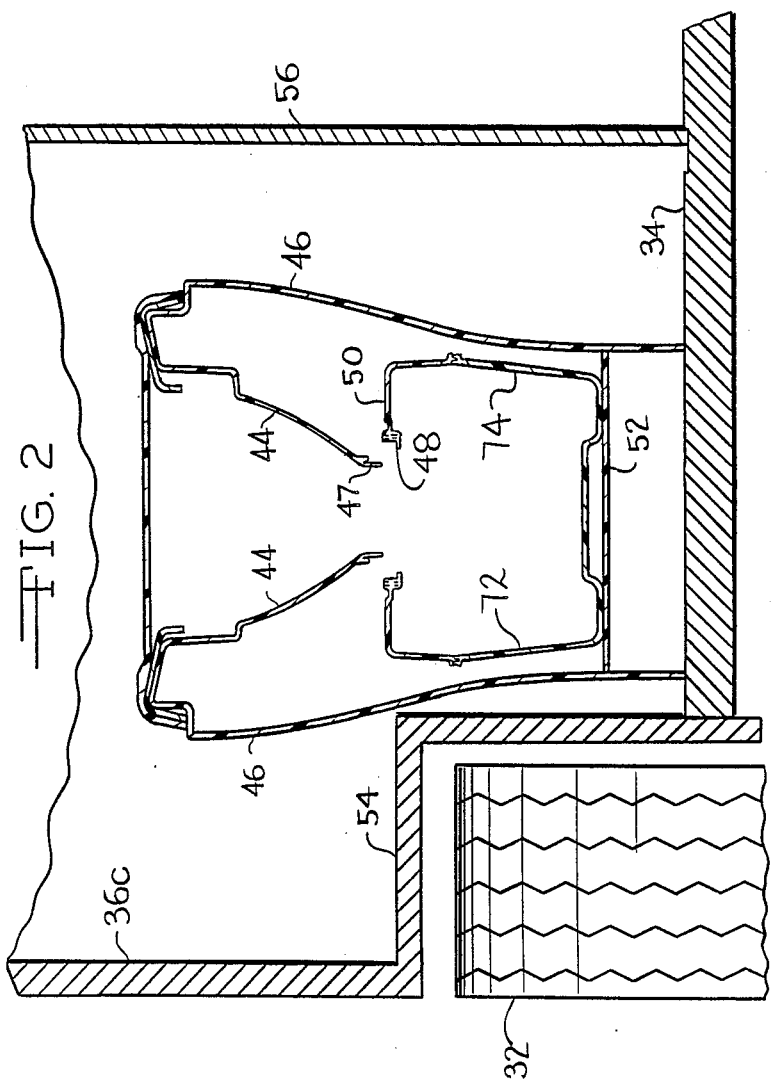
FIG. 2 is a transverse sectional view of a water use sanitary toilet located within the RV adjacent to a wheel well.

Referring now to FIG. 2, a cross section of a water use sanitary toilet is shown located adjacent to the tire 32 of the recreational vehicle. The toilet comprises a bowl 44 which is secured within the top of an upstanding base 46. This base sits directly on floor 34. Bowl 44 comprises an outlet 47 at its bottom which is shown in FIG. 2 spaced above inlet 48 of water holding tank 50. Details of the fluid connection between the bowl 44 and tank 50 are shown later. The tank 50 is supported upon a base 52 which is vertically spaced above the RV floor 34. Shown adjacent to the toilet is the tire 32 separated from the interior of the recreational vehicle by wheel well 54. Extending upward from the wheel well 54 is the RV sidewall 36c. Shown to the other side of the toilet is an interior wall 56 which separates the bathroom of the RV from the remaining interior occupant space.

Figure 3:
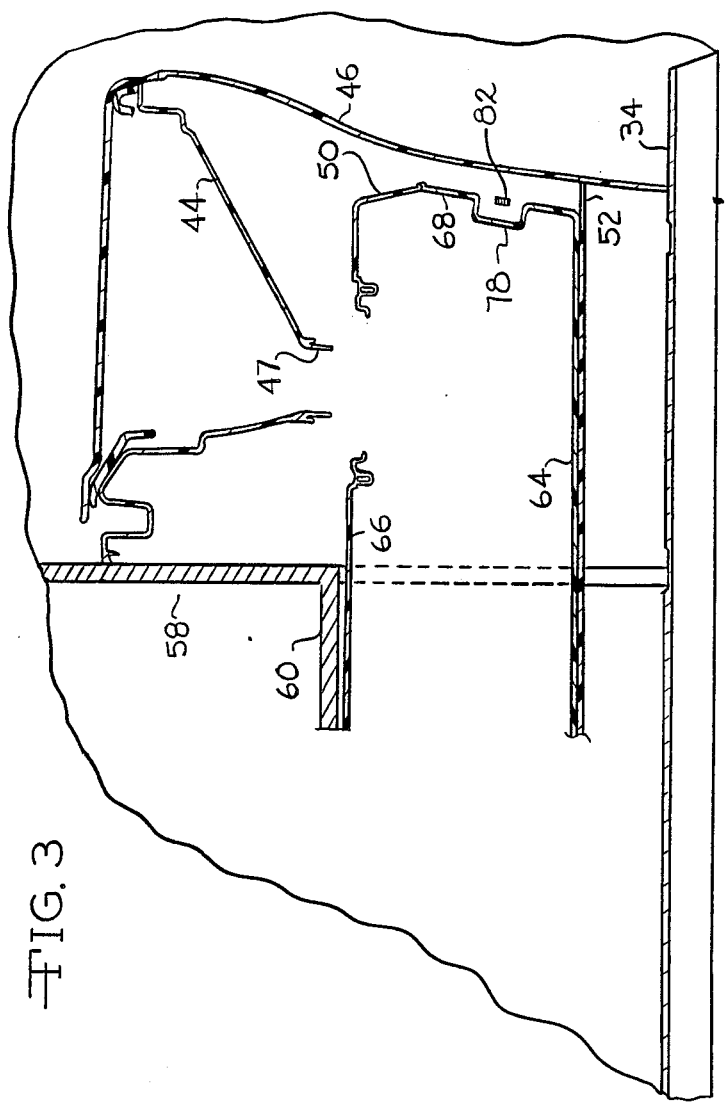
FIG. 3 is a longitudinal sectional view of the toilet of FIG. 2 showing a waste holding tank located below the toilet.

Referring now to FIG. 3, a crossectional side view of the toilet is shown. The tank 50 is shown extending rearward from the toilet through an opening in interior wall 58 which forms the rearward wall of the RV bathroom. Extending rearwardly from interior wall 58 is an horizontal wall 60 above the waste holding tank 50. Wall 60 is at a vertical height above floor 34 such that it can be used to support a bed, bench or other structure within the occupant space of the RV.

Figure 4:
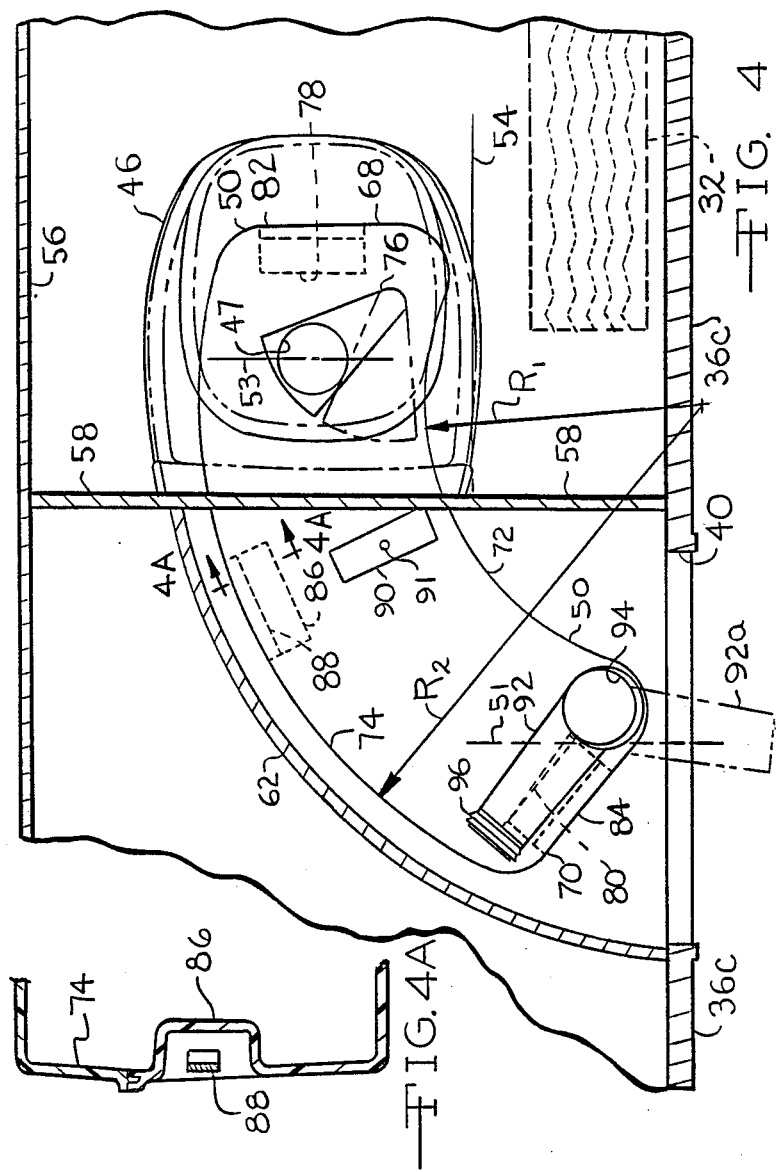
FIG. 4 is a plan view of the holding tank located below the water use sanitary toilet in a stowage compartment embodying principles of the invention.

Referring now to FIG. 4, a vertical wall 62 is shown extending rearward from the interior wall 58 and curving to the interior side of exterior sidewall 36c. Tank 50 is entirely enclosed in a stowage compartment which is defined by the upstanding base 46 of the toilet, vertical walls 62, 58, 36c, door 42, the horizontal base 52 and platform 60. This isolates the tank 50 from the interior occupant space of the RV. As shown in plan view in FIG. 4, the opening 40 in the sidewall 36c is displaced horizontally along the sidewall relative to the toilet bowl discharge outlet 47. The line 51 normal to sidewall 36c and extending through the center of opening 40 is displaced horizontally from the line 53 extending through the toilet bowl discharge outlet 47 and normal to the sidewall 36c.

The tank 50 is constructed of a generally horizontal bottom 64 and top 66 which is spaced above bottom 64, end portions 68 and 70 vertically disposed between top 66 and bottom 64 and curved vertical side walls 72 and 74. As seen in FIG. 2, the tank 50 has a generally rectangular crossection. Side walls 72 and 74 are curved along parallel circular paths such that the circles share a common center point. Sidewall 72 has a radius of curvature $R_1$, while sidewall 74 has a radius of curvature of $R_2$ which is greater than $R_1$ as shown in FIG. 4.

When not in use, the inlet 48 of the tank is closed by a generally triangular shaped blade valve 76. For flushing of the toilet, the blade valve is rotated to the position shown in broken lines adjacent to the inlet 48. This allows the waste to drain from the bowl 44 into the holding tank 50. After use, the blade valve 76 is moved back to close the inlet 48.

Tank ends 68 and 70 include recesses 78 and 80 which are spanned by handles 82 and 84. Likewise, sidewall 74 includes at its center a recess 86 which is spanned by a handle 88. Handle 88 is shown in section in FIG. 4A. A handle 90 is attached to the top 66 directly above the location of the center of gravity 91 of the holding tank 50 when filled with waste.

Figure 5:
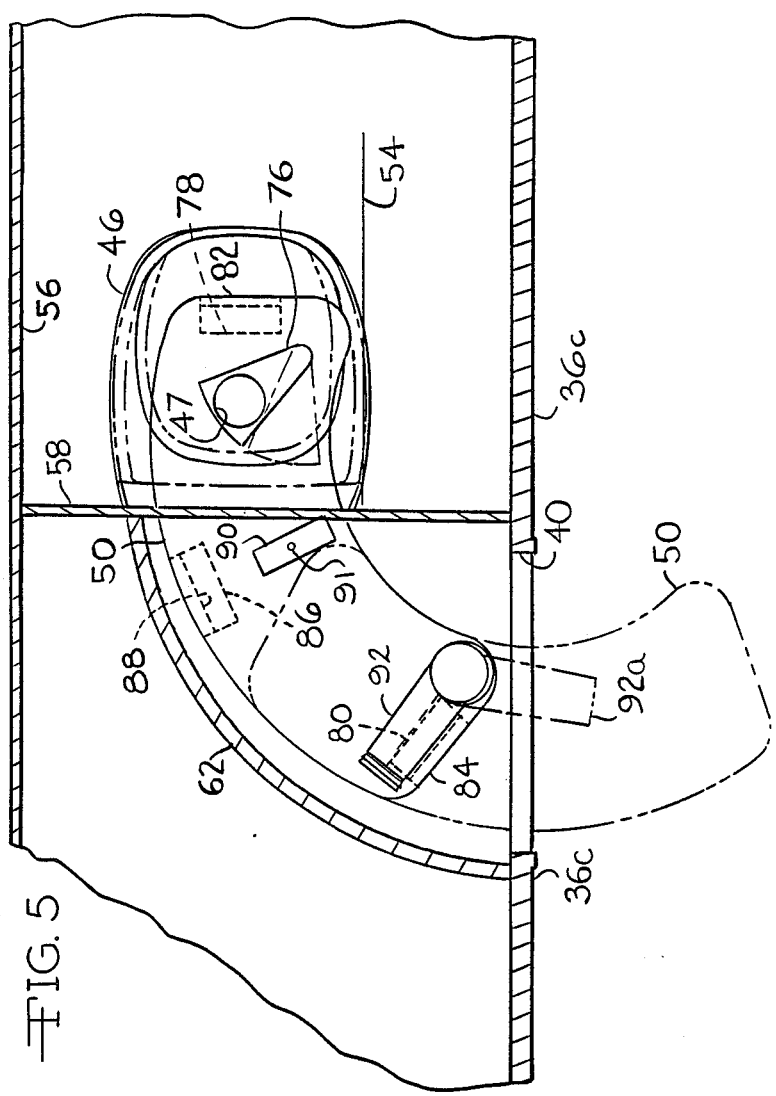
FIG. 5 is a plan view of the holding tank shown in FIG. 4 showing the tank being removed from the stowage compartment.

When filled, the holding tank 50 is removed from the RV directly to the exterior of the RV through opening 40 as shown by the broken lines in FIG. 5. This is accomplished by grasping handle 84 and pulling outward such that the tank 50 moves in an arcuate path through the stowage chamber. Once removed from the RV, the tank 50 can be carried to a disposal site for disposal of the waste therein. Handle 88 is positioned in the sidewall 74 such that the tank 50 will be evenly balanced fore and aft of handle 88 for convenience of carrying.

Figure 6:
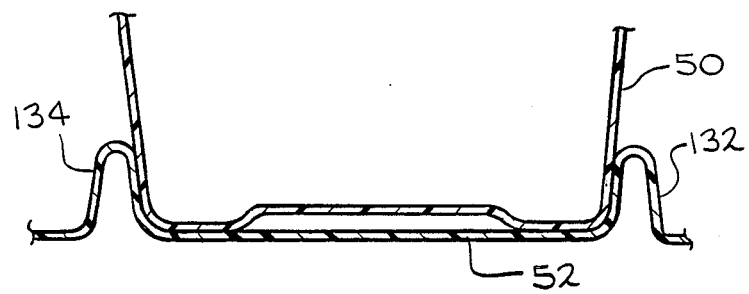
FIG. 6 is a sectional view of the holding tank and track structure within the stowage compartment for guiding the tank into and out of the stowage compartment.

To facilitate removal and installation of tank 50, horizontal base 52 incorporates a track structure as shown in FIG. 6. This track structure is formed by a pair of spaced apart upwardly projecting tracks 132 and 134. Tracks 132 and 134 serve to guide the tank for motion into and out of the stowage compartment along an arcuate path. In addition, tracks 132 and 134 also retain tank 50 in position within the stowage compartment. Tracks 132 and 134 must be positioned to ensure automatic connection of tank inlet 48 with the bowl outlet 47 when installing the tank into the stowage compartment as described below. By making tank 50 and base 52 out of suitable plastic materials having low coefficients of friction, the tank can be slid directly on the tracks into and out of the stowage compartment.

The door 42 is preferably hinged at its lower edge such that when opened, the door forms a horizontal support platform extending outward from the sidewall 36c. Tank 50 can be supported on the open door 42 for manipulation of the tank while removing or installing the tank.

The holding tank includes a rotatable pourspout 92 mounted in a hole 94 in one of the corners of the top 66. Pourspout 92 has a keyed and sealed engagement with the hole 94 to maintain sealing contact between the spout and the tank for all positions of rotation about the axis of the hole 94 and to prevent separation of the pourspout from the tank for all positions of rotation, save the unique position at which the pourspout 92 can be removed and installed. FIGS. 4 and 5 illustrate pourspout in its stowed position which overlies the top portion 66. The end of the spout is shown closed by a removable closure cap 96. The pourspout is rotatable from its stowed position to a range of pourout positions, one of which is portrayed in the broken lines of FIGS. 4 and 5 designated as 92a. In the pourout position, the pourspout points away from tank 50 beyond its sidewall 84. Other details of the pourspout and the keyed and sealed connection of the pourspout and the holding tank are disclosed in U.S. patent application Ser. No. 870,800, filed June 5, 1986, now U.S. Pat. No. 4,776,631, commonly assigned and incorporated herein by reference. For emptying of the tank 50, after the tank has been carried to a disposal site, the pourspout is rotated to the position shown in 92a, the closure cap 96 is removed from the end of the pourspout and the tank lifted such that the pourspout 92 extends below the tank to allow the contents of the tank to drain out of the tank through the pourspout 92. To prevent belching or burping of the contents during discharge, an air vent can be installed at the opposite end of the tank as disclosed in U.S. patent application Ser. No. 870,800.

In the event that the holding tank were to filled beyond its capacity, the organization and arrangement of the holding tank provides a way to alleviate such a condition. If the tank were to be overfilled, the door 42 to the stowage compartment can be opened, the pourspout rotated to a pouring position pointing out through the access opening 40 and the closure cap on the end of the pourspout removed. The pourspout defines a weir level below that of the value blade 76 so that excess waste will flow out of the tank to bring the level to that of the weir level defined by the pourspout. This will alleviate the overfilling and then the spout can be capped in the usual manner, the tank removed and transported for dumping.

Figure 7:
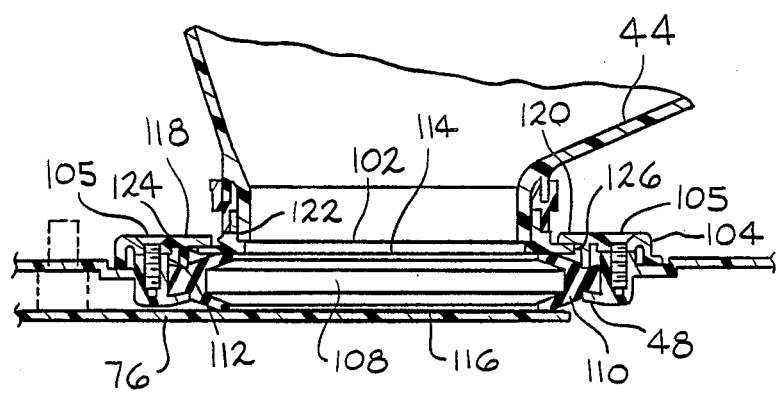
FIG. 7 is an enlarged fragmentary vertical sectional view of the fluid connection between the toilet outlet and holding tank.
Figure 8:
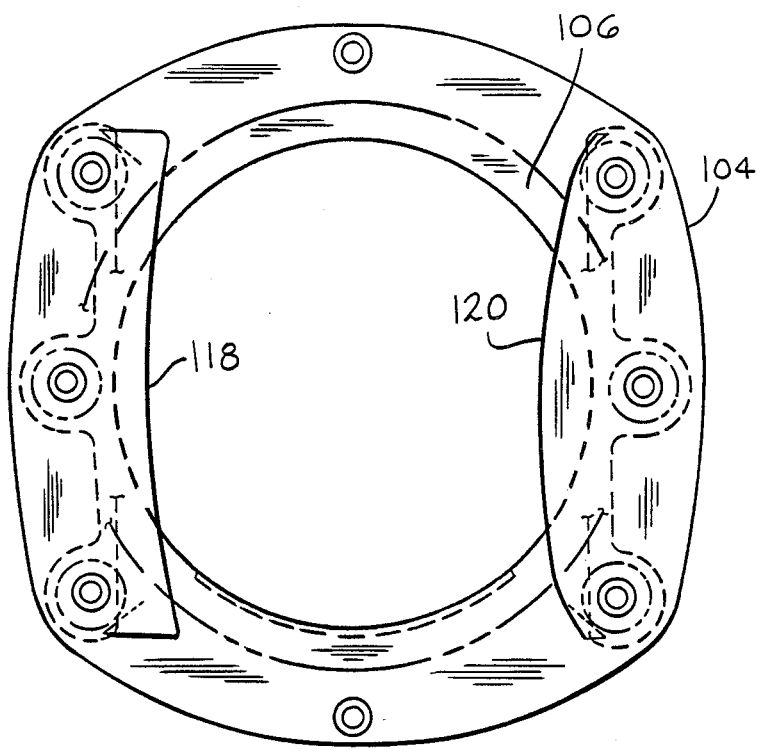
FIG. 8 is a plan view of the coupling member attached to the top of the holding tank inlet.

The holding tank inlet automatically connects to and disconnects from the toilet bowl outlet in accompaniment of moving the holding tank into and out of the stowage compartment. For a toilet installation, it is important for these separable connections between the holding tank inlet and toilet bowl outlet to be of a sealed nature when connected. Briefly, the guidance provided for holding tank 50 by the guide tracks will serve to establish precise alignment for proper registration of the bowl outlet 47 and the holding tank inlet 48. An additional means, however, is associated with the bowl outlet opening and the holding tank inlet to take into account certain tolerance variations which will inherently exist in the commercial manufacture of the product to ensure that the final connection is properly sealed. Details are shown in FIGS. 6 and 7.

A flange member 102 is fitted around the bowl outlet opening at the bottom of the bowl. Member 102 forms one part of the guide mechanism for guiding the holding tank opening into precise alignment registering with the bowl outlet inlet. The other part of the guide mechanism is formed by a member 104 which attaches to the top portion 66 of holding tank 50 around inlet 48 by six screws 105.

Member 104 comprises a central annular portion 106 which serves to retain an annular elastomeric seal 108 on tank 50 around inlet 48. Specifically, seal 108 comprises a main body 110 which is disposed in a circular cavity 112 around the circular inlet 48. A pair of annular lips 114 and 116 project from main body 110. The annular retention portion 106 fits onto the top holding tank surface around cavity 112 and compresses the annular body of the elastomeric seal downwardly in the cavity to provide a seal of the elastomeric body to the holding tank around inlet 48. The member 104 further comprises channels 118 and 120 formed along its longitudinal sides that are parallel with the direction of movement of the holding tank into and out of the stowage compartment in an arcuate path.

Flange member 102 comprises an annular portion 122 which fits on the bowl outlet and side edge portions 124 and 126 which, like channels 118 and 120, are parallel with the direction of motion of the holding tank into and out of the stowage compartment. These side edge portions are arcuate and parallel.

The two members 102 and 104 are also disposed around the bowl outlet and the holding tank respectively so that the side edge portions 124 and 126 slide into and out of edge channels 118 and 120 as the tank is moved into and out of stowage. Each channel has essentially a 90° crossection composed of a horizontal side and a vertical side. The vertical clearance dimension from the horizontal sides of the channels 118 and 120 to the top of lip 114 is less than the thickness of the side edge portions 124 and 126 of flange member 102 and therefore a very precise vertical fit occurs as the member 104 slides onto the flange member 102 so that a controlled deflection of lip 114 results. Similarly the nominal width of the flange member across the straight portions of the side edges is just slightly less than the clearance width between the vertical sides of the two channels 118 and 120.

The lip 116 of the seal 108 extends downward into the holding tank and has cooperative association with blade 76 which opens and closes inlet 48 so that when the blade is closed the lip 116 is deflected slightly upwardly to provide annular sealing contact with blade 76 around inlet 48. Other details of the sealed connection between the holding tank and the toilet bowl are disclosed in U.S. patent application No. 870,800, filed June 5, 1986.

It is to be understood that the invention is not limited to the exact construction or method illustrated and described above, but that various changes and modifications may be made without departing from the spirit and scope of the invention as defined in the following claims.

What is claimed is:

1. In a recreational vehicle having a wheeled chassis on which a vehicle body is supported, said body comprising a horizontal floor which overlies the chassis and a vertical sidewall which extends upwardly from the floor, said floor and sidewall being exterior walls of said body, said body having an occupant space which contains a water use sanitary toilet having a bowl with a discharge outlet at the lower end thereof, wall means cooperatively associated with said floor, sidewall and said toilet to form a stowage compartment in the interior of said body but separated from said occupant space, a portion of said stowage compartment being positioned below said bowl, an opening in said sidewall between said stowage compartment and the exterior of said body, a closure for opening and closing said opening, a liquid waste tank within said stowage compartment for collection of waste water which has been used in said sanitary toilet, said tank being positioned within said stowage compartment and hidden from view in said occupant space by said wall means and said toilet, said tank having a size and shape which allows it to pass bodily through said opening when said closure opens said opening, means providing a disconnectable fluid connection between said tank and said sanitary toilet discharge outlet which when connected enables fluid to pass from said toilet bowl into said tank and when disconnected allows said tank to be bodily removed from said stowage compartment through said open opening, said tank including generally horizontal top and bottom walls spaced from one another, first and second curved upright sidewalls joining said top and bottom walls along longitudinal edges of said top and bottom walls, and end walls disposed at opposite ends of said tank to close said tank forming a hollow tank curved along the longitudinal length of said tank, said opening being displaced from said toilet such that in plan view a line normal to said sidewall and extending through the center of said opening is displaced from a line normal to said sidewall and extending through the center of said bowl discharge outlet, and guide means operatively associated with said stowage compartment and said tank for directing said tank along a predetermined arcuate path when said tank is removed from and installed in said stowage compartment through said opening.

2. The body of claim 1 further comprising a base for said stowage compartment disposed at a vertical level above said floor.

3. The body of claim 1 wherein said guide means includes a pair of horizontal parallel arcuate tracks engaging lower parallel edge portions of said tank.

4. The body of claim 1 wherein said upright sidewalls are curved in circular paths having a common center point, said second sidewall having a radius of curvature greater than said first sidewall.

5. The body of claim 4 wherein said second sidewall has a handle integrally formed generally at the longitudinal center of said second sidewall.

6. The body of claim 4 further comprising a handle attached to said top wall and positioned generally above the center of gravity of the tank with waste in said tank when said tank is positioned in said stowage compartment.

7. The body of claim 4 further comprising handles integrally formed in said end walls.

8. A waste holding tank for use with a water use sanitary toilet in a recreational vehicle, said tank separably connected to said toilet to form a fluid connection therebetween to allow waste from said toilet to pass into said tank, said tank comprising
a generally horizontal bottom wall;
a generally horizontal top wall vertically spaced above said bottom wall;
first and second upright end walls disposed between said top and bottom wall; and
first and second curved upright sidewalls disposed between said bottom and top walls joining said top and bottom walls along longitudinal edges of said top and bottom walls, said sidewalls being curved in arcuate paths about a common center point.

9. The tank of claim 8 further comprising:
a handle in said second sidewall at the longitudinal center of said second sidewall.

10. The tank of claim 8 further comprising:
a handle attached to said top wall above the center of gravity of said tank with waste in said tank when said tank is supported on a horizontal surface.

11. A recreational vehicle comprising:
a body having a generally horizontal floor and a generally vertical sidewall;
a water use sanitary toilet within said body having a bowl for receiving wastes therein, said bowl having a bottom discharge outlet disposed above said floor;
an opening in said sidewall, said opening being horizontally displaced from said toilet such that in plan view a line normal to said sidewall and extending through the center of said sidewall opening is displaced from a horizontal line normal to said sidewall and extending through the center of said bowl discharge outlet;
a waste holding tank having generally horizontal top and bottom walls, first and second upright end walls disposed between said top and bottom walls and first and second curved upright sidewalls joining said top and bottom walls along longitudinal edges of said top and bottom walls forming a hollow tank curved along the longitudinal length of said tank, said side walls forming part circular segments in horizontal cross-section, said tank having a waste inlet in said top wall adjacent said first end wall;
said tank having an operable position in which said inlet is in fluid connection with said bowl discharge outlet to receive waste therefrom and said second end wall is adjacent said opening in said sidewall.

12. The recreational vehicle of claim 11 wherein:
said tank includes a pourspout in said top wall adjacent said second end, said pourspout being rotatable between stowage and discharge positions, when said tank is in said operable position and said pourspout is in said discharge position said pourspout extends through said opening;
said pourspout defining a weir level below said tank inlet such that excess waste can be discharged from said tank when said tank is in said operable position.

13. A recreational vehicle comprising:
a wheeled chassis upon which is supported a vehicle body, said body having a horizontal floor and a vertical sidewall which extends upwardly from the floor, said floor and sidewall being exterior walls of said body, said body having an interior occupant space and said body further including means forming a wheel well for separating one or more wheels of said wheeled chassis from said occupant space;
a water use sanitary toilet within said body having a bowl for receiving wastes therein, said bowl having a bottom discharge outlet disposed above said floor and said toilet being positioned within said body adjacent to said wheel well means such that said wheel well means is between said sidewall and said toilet;

wall means cooperatively associated with said body and toilet to form a stowage compartment in the interior of said body but separated from said occupant space, a portion of said stowage compartment being positioned below said toilet bowl discharge outlet and said discharge outlet extending downwardly into said storage compartment, said stowage compartment extending horizontally around said wheel well means and terminating at said sidewall adjacent said wheel well means;

an opening in said side wall between said stowage compartment and the exterior;

a closure for opening and closing said opening;

a liquid waste holding tank within said stowage compartment for collection of waste water which has been used in said sanitary toilet, said tank having a size and shape which allows it to pass bodily through said opening when said closure opens said opening, said tank including generally horizontal top and bottom walls spaced from one another, first and second curved upright sidewalls joining said top and bottom walls along longitudinal edges of said top and bottom walls, and end walls disposed at opposite ends of said tank to close said tank forming a hollow tank curved along the longitudinal length of said tank; and guide means operatively associated with said stowage compartment and said tank for directing said tank along a predetermined arcuate path around said wheel well means when said tank is removed from and installed in said stowage compartment through said opening.

* * * * *